United States Patent [19]
Müller et al.

[11] Patent Number: 5,180,187
[45] Date of Patent: Jan. 19, 1993

[54] COVER FOR AN AIRBAG UNIT AND THE PROCESS FOR PRODUCING IT

[75] Inventors: Manfred Müller, Deizisau; Wolfgang Henseler, Tübingen; Egon Katz, Nagold; Alban Bossenmaier, Gäufelden; Dietrich Hamm, Sindelfingen, all of Fed. Rep. of Germany

[73] Assignee: Daimler-Benz AG, Fed. Rep. of Germany

[21] Appl. No.: 731,974

[22] Filed: Jul. 18, 1991

Related U.S. Application Data

[63] Continuation of Ser. No. 470,798, Jan. 26, 1990, abandoned.

[51] Int. Cl.⁵ .............................................. B60R 21/08
[52] U.S. Cl. ..................................... 280/732; 280/743
[58] Field of Search ............... 280/728, 730, 731, 732, 280/743

[56] References Cited
U.S. PATENT DOCUMENTS

| | | | |
|---|---|---|---|
| 3,794,349 | 2/1974 | Fuller | 280/732 |
| 4,334,699 | 6/1982 | Patzelt et al. | 280/731 |
| 4,895,389 | 1/1990 | Pack, Jr. | 280/732 |
| 4,960,292 | 10/1990 | Sadler | 280/731 |
| 5,002,307 | 3/1991 | Heidorn | 280/743 |
| 5,009,452 | 4/1991 | Miller | 280/743 |

*Primary Examiner*—Kenneth R. Rice
*Attorney, Agent, or Firm*—Evenson, Wands, Edwards, Lenahan & McKeown

[57] ABSTRACT

The application is concerned with a cover of an airbag unit in a motor vehicle which is equipped with a tear-open line and has a foam-backed foil and the process for making the cover. The process includes:

a) heating a foil in the region of the intended tear-open line;
b) forming a channel in the foil which is drawn-in in relation to the adjoining face of the foil in the region of the tear-open line;
c) creating a reduction in wall thickness of the foil at the tear-open line, located at a channel bottom, by high-frequency embossing;
d) introducing the foil into a mold and foam backing the foil;
e) producing a smaller wall thickness in the foam backing in the region of the tear-open line.

9 Claims, 1 Drawing Sheet

COVER FOR AN AIRBAG UNIT AND THE PROCESS FOR PRODUCING IT

This is a continuation of application Ser. No. 07/470,798, filed Jan. 26, 1990, now abandoned.

BACKGROUND AND SUMMARY OF THE INVENTION

The invention relates to a cover intended for an airbag unit in a motor vehicle. The cover is a foam-backed foil and is equipped with a tear-open line. The foam backing is made with a smaller wall thickness in the region of the tear-open line than in other regions of the cover.

A cover for an unfoldable airbag (known from German Offenlegungsschrift No. 3,315,535) has two foils welded together in the region of a tear-open line. The tearing strength of the welding seam is lower than the tearing strength of the foils themselves. A cover of this type, although meeting all the requirements demanded of it as regards reliable functioning, nevertheless involves a high outlay in terms of production, in as much as two foils have to be brought together by means of appropriate tools. Moreover, it is quite difficult to ensure that the seam between the two foils has a pleasing visual appearance.

Also, the use of a high-frequency cutting instrument for making an incision in a cushioning layer of an airbag is known from German Offenlegungsschrift No. 2,643,451 (Page 7, Lines 4 and 5).

The object on which the present invention is based was to avoid the disadvantages of a construction according to German Offenlegungsschrift No. 3,315,535 and provide a simple practicable process for producing a cover for an airbag unit, which at the same time ensures a visually satisfactory appearance.

According to the invention, this object is achieved by employing the following process steps of:

a) a heated foil (continuous in the region of the intended tear-open line) is deep-drawn in such a way that a drawn-in channel (in relation to the adjoining face) is formed in the region of the tear-open line;

b) a reduction in wall thickness of the foil is made on the channel bottom by high-frequency embossing to define the tear-open line;

c) the foil is then placed into a mold and foam-backed in a known manner.

Other objects, advantages and novel features of the present invention will become apparent from the following detailed description of the invention when considered in conjunction with the accompanying drawings.

DETAILED DESCRIPTION OF THE DRAWINGS

Figure 1:
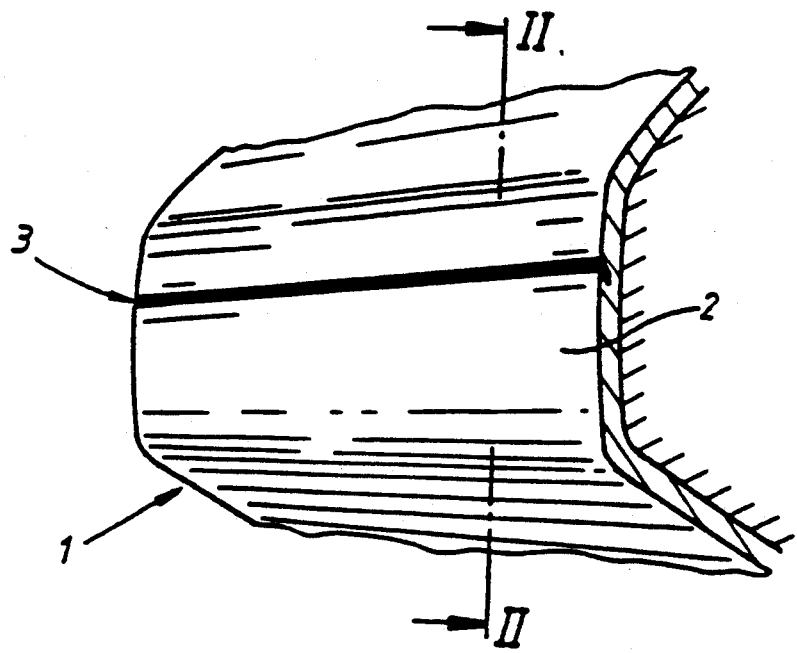
FIG. 1 shows a perspective view of a cover made by the process.
Figure 2:
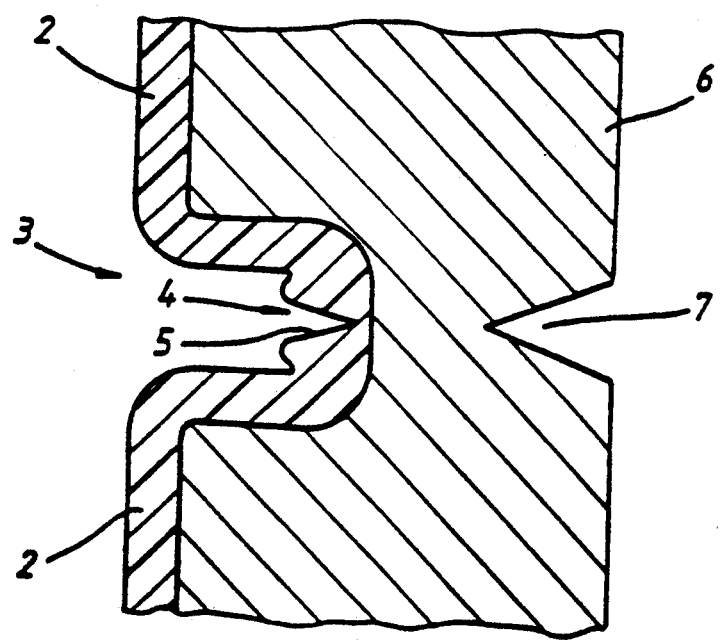
FIG. 2 shows a section along a line II—II of FIG. 1 on a larger scale.

The foil 2 forming the outer face of an airbag cover 1 for a motor vehicle restraining system is shaped (in the heated state) by a deep-drawing process to provide a U-shape drawn-in channel 3. For example a vacuum-drawing process can form a drawn-in channel 3 and channel bottom 4 in a heated foil. A wall-thickness reduction 5 is then made in the region of this channel bottom 4 by high-frequency embossing to define a tear-open line.

The width and depth of the channel 3 are selected in such a way that the wall-thickness reduction 5 is not conspicuous, at least not during a superficial glance.

The deep-drawn foil 2 is then introduced into a foaming mold wherein it is equipped with a foam backing 6 in a known manner. The foam backing 6 likewise has a region 7 of reduced wall thickness in the region of the tear-open line in a similar way to the foil 2. The reduction region 7 of the foam can be created by any known process such as that shown in German Offenlegungsschrift No. 2,643,651.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A cover for an airbag unit having a tear line, comprising:
   a foil layer, having an outer surface, an inner surface, and a foil wall thickness, including a substantially U-shaped channel formed in said foil layer by heating and deep drawing said foil layer in the region of the tear line, said U-shaped channel having an open end on said outer surface and a bottom channel surface, said foil wall thickness being reduced at said bottom channel surface by high frequency embossing to form an inconspicuous tear line; and
   a foam layer adhered to said inner surface of said foil layer by foam backing said foil layer in a mold.

2. A cover according to claim 1, wherein said foil wall thickness is reduced by high frequency embossing a substantially inwardly V-shaped groove along said bottom channel surface.

3. A cover according to claim 1, wherein said foam layer has its foam thickness reduced in an area coinciding with the tear line.

4. A cover according to claim 3, wherein said area coinciding with the tear line is adjacent a plane of the tear line.

5. A cover according to claim 3, wherein said foam layer is reduced by forming a substantially V-shaped groove in said foam backed layer.

6. A foam-backed foil cover for an airbag unit of a motor vehicle equipped with a tear-open line, comprising:
   a foil extending over an opening of the airbag unit;
   said foil having an inwardly U-shaped depression;
   a bottom of said U-shaped depression having a reduced thickness portion to define a tear-open line; and
   a foam backing attached to the foil.

7. A cover of claim 6, wherein there is a reduced thickness in the foam backing at a point adjacent the reduced thickness portion of the foil.

8. The cover of claim 6, wherein the depression in the foil mates with a corresponding depression in the foam backing.

9. The cover of claim 7, wherein the depression in the foil mates with a corresponding depression in the foam backing.